US012611900B2

(12) United States Patent
Howard

(10) Patent No.: US 12,611,900 B2
(45) Date of Patent: Apr. 28, 2026

(54) FIFTH WHEEL TRAILER STABILIZER DEVICE

(71) Applicant: Bobby Howard, Madill, OK (US)

(72) Inventor: Bobby Howard, Madill, OK (US)

( * ) Notice: Subject to any disclaimer, the term of this patent is extended or adjusted under 35 U.S.C. 154(b) by 310 days.

(21) Appl. No.: 18/527,810

(22) Filed: Dec. 4, 2023

(65) Prior Publication Data

US 2024/0190192 A1 Jun. 13, 2024

Related U.S. Application Data

(60) Provisional application No. 63/431,856, filed on Dec. 12, 2022.

(51) Int. Cl.
| | |
|---|---|
| *B60D 1/66* | (2006.01) |
| *B62D 53/08* | (2006.01) |
| *B62D 63/08* | (2006.01) |

(52) U.S. Cl.
CPC ........... *B60D 1/66* (2013.01); *B62D 53/0842* (2013.01); *B62D 63/08* (2013.01)

(58) Field of Classification Search
CPC ....... B60D 1/66; B62D 53/0842; B62D 63/08
See application file for complete search history.

(56) References Cited

U.S. PATENT DOCUMENTS

| | | | | |
|---|---|---|---|---|
| 3,454,251 | A | 7/1969 | Dye | |
| 3,656,778 | A | 4/1972 | Bristol | |
| 3,933,372 | A | 1/1976 | Herndon | |
| 4,905,953 | A * | 3/1990 | Wilson ...................... | B60S 9/04 |
| | | | | 248/352 |

| | | | | |
|---|---|---|---|---|
| 5,575,492 | A | 11/1996 | Stone | |
| 9,340,080 | B2 * | 5/2016 | Garceau ................... | B60D 1/66 |
| 2007/0114734 | A1 | 5/2007 | Jacques | |
| 2009/0200782 | A1 * | 8/2009 | Albrecht ................... | B60S 9/04 |
| | | | | 280/763.1 |

FOREIGN PATENT DOCUMENTS

| | | | | | |
|---|---|---|---|---|---|
| CA | 2281309 | A1 * | 2/2000 | | |
| CN | 204336237 | U * | 5/2015 | | |
| CN | 208834649 | U * | 5/2019 | | |
| DE | 19632400 | A1 * | 9/1997 | ............. | A47L 9/244 |
| FR | 2947154 | A1 * | 12/2010 | ............... | A45B 3/12 |

OTHER PUBLICATIONS

CA-2281309-A1 English Translation (Year: 2000).*
CN-204336237-U English Translation (Year: 2015).*
CN-208834649-U English Translation (Year: 2019).*
DE-19632400-A1 English Translation (Year: 1997).*
FR-2947154-A1 English Translation (Year: 2010).*

* cited by examiner

*Primary Examiner* — Michael T. Walsh
(74) *Attorney, Agent, or Firm* — Brennan, Manna & Diamond, LLC

(57) ABSTRACT

A foldable fifth wheel trailer stabilizer device is disclosed. The device is attached to the trailer's king pin box and features two telescoping legs with adjustable knobs for length adjustment. The legs are equipped with chains for added support and are complemented by adjustable supporting members on the king pin box for support when folded and are not in use. In one embodiment, the device includes an additional telescoping leg connected to a horizontal member that spans the first and second legs. The additional leg is also adjustable in length and can be secured with chains for further support. The device is adaptable to various trailer heights and can be easily folded for convenient storage and transportation.

9 Claims, 5 Drawing Sheets

FIFTH WHEEL TRAILER STABILIZER DEVICE

CROSS-REFERENCE TO RELATED APPLICATION

The present application claims priority to, and the benefit of, U.S. Provisional Application No. 63/431,856, which was filed on Dec. 12, 2022, and is incorporated herein by reference in its entirety.

FIELD OF THE INVENTION

The present invention generally relates to the field of trailer stabilizer device. More specifically, the present invention relates to a novel fifth (5th) wheel camper trailer stabilizer device. The device includes a plurality of telescoping legs with adjustable knobs for quick setup, ensuring a stable foundation on different terrains. Additional support is provided through chains and an optional third telescoping leg thereby enhancing stability. The legs offer a secure attachment to the trailer's king pin box and a supporting member for each leg provides reliable support in the folded position. Accordingly, the present disclosure makes specific reference thereto. Nonetheless, it is to be appreciated that aspects of the present invention are also equally applicable to other like applications, devices, and methods of manufacture.

BACKGROUND

By way of background, a fifth wheel trailer is a type of towable RV, horse, or utility trailer that is attached to a pickup truck using a fifth wheel hitch. A fifth wheel camper/horse/utility trailer is also known as simply a fiver. The fifth wheel hitch is a special type of hitch that mounts in the bed of the truck and provides a more stable and secure connection than a traditional ball hitch mounted at a rear of a vehicle. Fifth wheel camper and horse trailers are commonly larger and more spacious than other types of towable RVs, and can offer a wide variety of amenities, including full kitchens and bathrooms, separate living and sleeping areas, and even slide-outs to increase the living space.

Fifth wheel camper trailers are popular recreational vehicles for travelers and outdoor enthusiasts. However, fifth wheel camper/horse trailers generally are susceptible to rocking or swaying when detached from the towing vehicle. Constant unwanted movement of rocking and swaying can result from various factors, such as moderate winds, uneven terrain, or even the simple act of a person or animal entering, exiting, or moving around inside the trailer. The problem creates excessive problems when occupants are attempting to sleep, as the continuous motion can lead to discomfort and even disturbed sleep patterns.

Existing solutions to address stability problem of fifth wheel camper/horse trailers include the use of stabilizers, which are deployable mechanisms designed to reduce trailer movement. The stabilizers are positioned near the trailer's wheels or corners, rely on ground contact to stabilize the vehicle. However, conventional stabilizers have several significant drawbacks, primarily the consumption of valuable storage space within the trailer when not in use. Also, installing, removing, and storing a stabilizer consumes time and requires physical effort. Despite the existence of various stabilizing solutions, there remains a need for an innovative, space-efficient, and user-friendly stabilizing system for fifth wheel camper/horse trailers.

Therefore, there exists a long felt need in the art for an improved stabilizer for fifth wheel camper/horse trailers. Additionally, there is a long felt need in the art for a novel fifth wheel trailer stabilizer that can be attached to a trailer pin box. Moreover, there is a long felt need in the art for a fifth wheel trailer stabilizer stand that can be folded and adhere to the pin box when the stand is not used. Further, there is a long felt need in the art for a stabilizer device for fifth wheel camper trailers that can be adjusted in height to provide support to the trailer on any surface. Furthermore, there is a long felt need in the art for a fifth wheel trailer stabilizer device that is not required to be installed and removed from the trailer pin box and that obviates the need for storage inside the trailer. Also, there is a long felt need in the art for a stabilizer for camper/horse trailers that prevents errant movement of the trailer due to entry, exit, moderate winds, walking around the trailer, and more. Finally, there is a long felt need in the art for a stabilizer device for camper/horse trailers that is attached to the king pin box and that can be folded to become a part of the king pin box thereby obviating the need for storage in the trailer for an extraneous device.

The subject matter disclosed and claimed herein, in one embodiment thereof, comprises a foldable fifth wheel trailer stabilizer device designed to eliminate instability and rocking in fifth wheel camper/horse trailers. The device comprises a first telescoping leg pivotally attached to a side surface of a king pin box, a second telescoping leg pivotally attached to the opposite side surface of the king pin box, each telescoping leg features a bottom end with a square or rectangular base, each leg is adapted to transition between a folded state and an unfolded state, wherein in the folded state, a supporting member for each leg is disposed on the king pin box and supports the leg and in the unfolded state, the base of each leg is placed on a surface for supporting the trailer. Each leg includes a chain for providing additional support wherein the chains of the legs can be fastened together for providing additional support to the device. In one embodiment, the device may include an additional leg for providing support and stability for heavier trailers.

In this manner, the trailer stabilizing device of the present invention accomplishes all of the forgoing objectives and provides users with a stabilizer device that is designed to eliminate instability and rocking in fifth wheel camper/horse trailers. The device provides a stable foundation that reduces the swaying and rocking motion, ensuring a more comfortable and secure experience for occupants and animals. The telescoping legs with adjustable knobs adjust the device to the required height, accommodating different trailer heights. The device can be folded when not in use, enabling for convenient storage and transportation. This maximizes available storage space and minimizes the need for complex assembly or disassembly. The device can provide extra support with three legs and chains, preventing or controlling lateral movement and further increasing stability, particularly for larger or heavier trailers.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a foldable fifth wheel trailer stabilizer device designed to eliminate instability and rocking in fifth wheel camper/horse trailers. The device comprises a first telescoping leg pivotally attached to a side surface of a king pin box, a second telescoping leg pivotally attached to the opposite side surface of the king pin box, each telescoping leg features a bottom end with a square or rectangular base, each leg is adapted to transition between a folded state and an unfolded state, wherein in the folded state, a supporting member for each leg is disposed on the king pin box and supports the leg and in the unfolded state, the base of each leg is placed on a surface for supporting the trailer.

In yet another embodiment, both telescoping legs have a plurality of telescoping pins on their narrow members, and an adjustment knob for engaging with one of the telescoping pins for length adjustment of the legs.

In another embodiment, the first and second telescoping legs are made of metal materials selected from the group consisting of steel and iron and are coated with a black powder coating for protection against rust and corrosion.

In another aspect of the present invention, the adjustable supporting members on the king pin box provide support to the folded legs when not in use, and the device is adapted to fit most 5th wheel trailers (i.e., campers, RVs, et. al.) due to the presence of telescoping legs and adjustment knobs for different trailer heights.

In yet another embodiment, a foldable fifth wheel trailer stabilizer device for use with fifth wheel camper/horse trailers, adapted for attachment to a trailer's king pin box is disclosed. The device comprising a first telescoping leg with a top end pivotally attached to a side surface of the king pin box and a bottom end equipped with a square or rectangular base. A second telescoping leg has a top end pivotally attached to the opposite side surface of the king pin box. The second telescoping leg also features a bottom end with a square or rectangular base. Both telescoping legs have a plurality of telescoping pins on their respective narrow members, and an adjustment knob for engaging with one of the telescoping pins for length adjustment. Each leg has a chain to provide additional support to the trailer and prevent lateral movement of the bases. An adjustable supporting member for each leg is positioned on the king pin box to support the leg in the folded state, wherein the first telescoping leg and the second telescoping leg are configured to pivotally transition between a folded state and an unfolded or deployed state to provide stability and support to the trailer in a manner that minimizes rocking and instability when in use.

In yet another aspect, a fifth wheel trailer stabilizer device attached to a trailer's king pin box is disclosed. The device comprising a first telescoping leg with a top end pivotally attached to a side surface of the king pin box and a bottom end equipped with a square or rectangular base, a second telescoping leg with a top end pivotally attached to the opposite side surface of the king pin box, the second telescoping leg also featuring a bottom end with a square or rectangular base, an additional leg pivotally connected to a horizontal connecting member that extends between the first and second telescoping legs, the additional leg being telescoping and having a chain for fastening to the chains of the first and second legs to provide additional support, the telescoping legs having a plurality of telescoping pins and an adjustment knob for engaging with one of the telescoping pins for selective length adjustment of each leg. The legs extend and rest on a surface to support a trailer and are folded and adhere to the box when use is not required.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
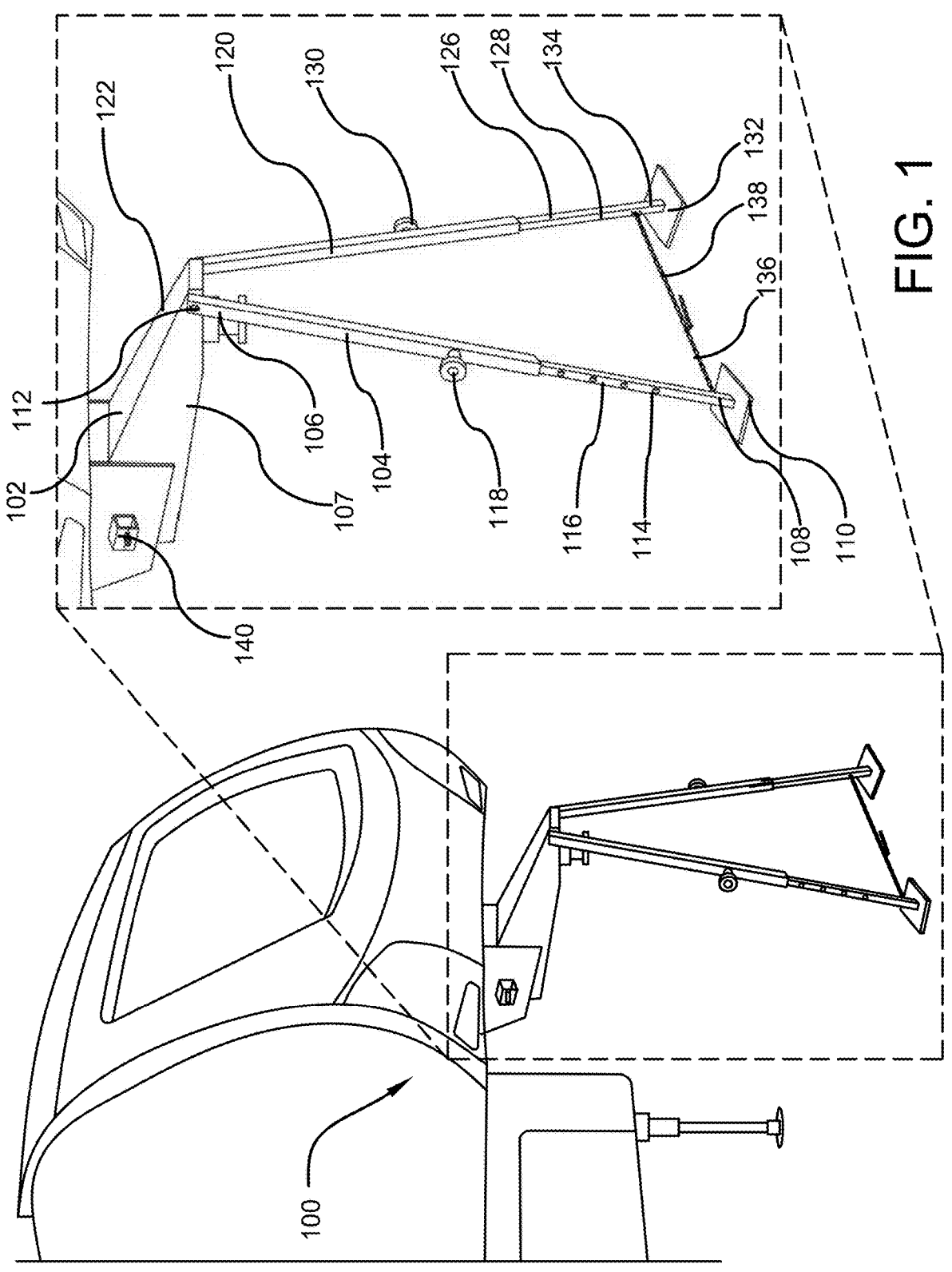
FIG. 1 illustrates a perspective view of one potential embodiment of the foldable fifth wheel trailer stabilizer device of the present invention in a deployed state in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved stabilizer for fifth wheel camper trailers. Additionally, there is a long felt need in the art for a novel fifth wheel trailer stabilizer that can be attached to a trailer pin box. Moreover, there is a long felt need in the art for a fifth wheel trailer stabilizer stand that can be folded and adhere to the pin box when the stand is not used. Further, there is a long felt need in the art for a stabilizer device for fifth wheel camper trailers that can be adjusted in height to provide support to the trailer on any surface. Furthermore, there is a long felt need in the art for a fifth wheel trailer stabilizer device that is not required to be installed and removed from the trailer pin box and obviates the need for storage inside the trailer. Also, there is a long felt need in the art for a stabilizer for a camper/horse/utility trailer that prevents errant movement of the trailer due to entry, exit, moderate winds, walking around the trailer, animal or livestock movements, and more. Finally, there is a long felt need in the art for a stabilizer device for trailers that is attached to the king pin box and can be folded to become a part of the king pin box thereby obviating the need for additional storage in the trailer for an extraneous device.

The present invention, in one exemplary embodiment, is a fifth wheel trailer stabilizer device attached to a trailer's king pin box. The device comprising a first telescoping leg with a top end pivotally attached to a side surface of the king pin box and a bottom end equipped with a square or rectangular base, a second telescoping leg with a top end pivotally attached to the opposite side surface of the king pin box, the second telescoping leg also featuring a bottom end with a square or rectangular base, an additional leg pivotally connected to a horizontal connecting member that extends between the first and second telescoping legs, the additional leg being telescoping and having a chain for fastening to the chains of the first and second legs to provide additional support, the telescoping legs having a plurality of telescoping pins and an adjustment knob for engaging with one of the telescoping pins for length adjustment. The legs extend and rest on a surface to support a trailer and are folded and adhere to the box when use in not required.

Figure 2:
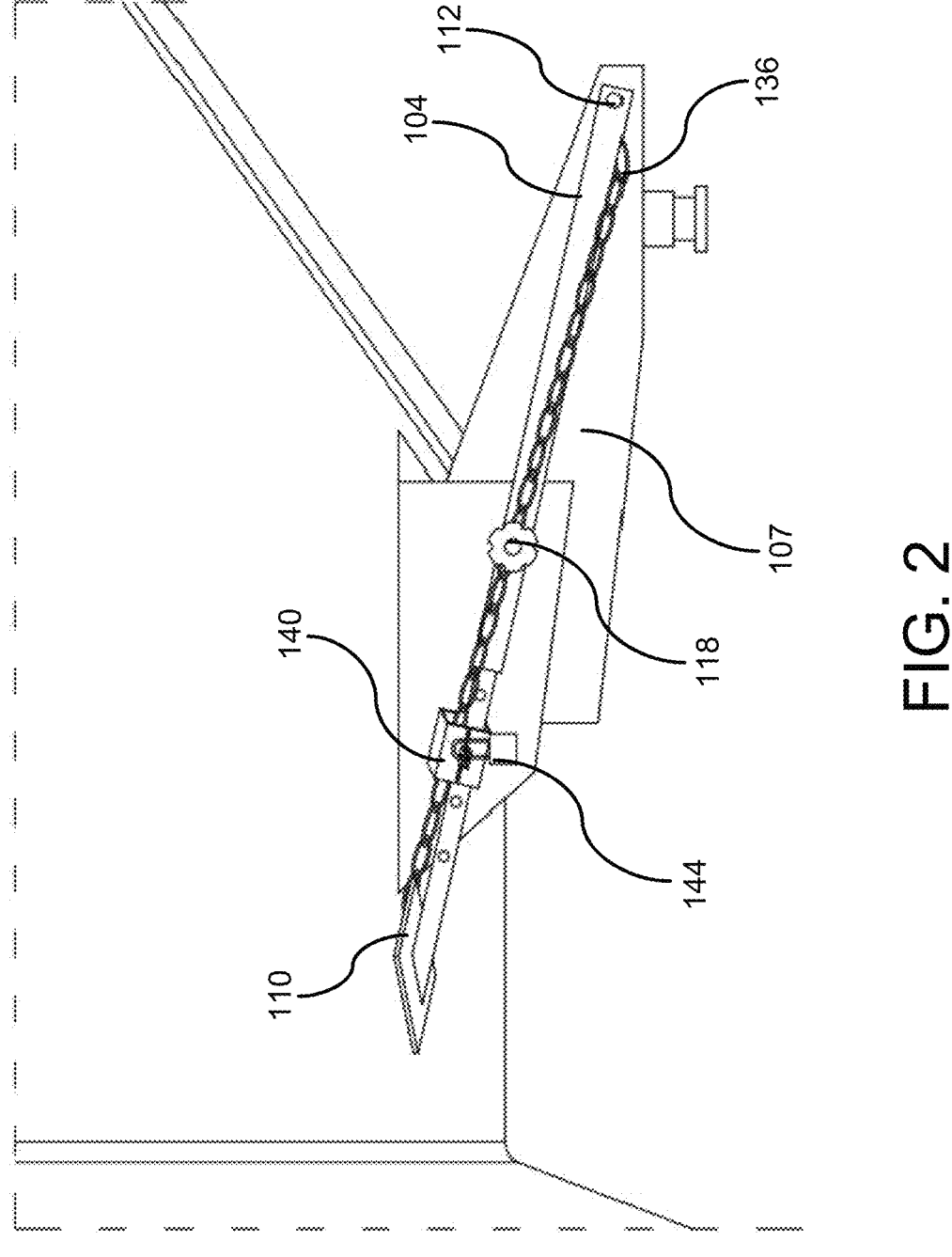
FIG. 2 illustrates a perspective view showing the fifth wheel trailer stabilizer device of the present invention in a folded state in accordance with the disclosed structure.

Referring initially to the drawings, FIG. 1 illustrates a perspective view of one potential embodiment of the foldable fifth wheel trailer stabilizer device of the present invention in a deployed state in accordance with the disclosed structure. The foldable fifth wheel trailer stabilizer device 100 of the present invention is designed to eliminate instability and rocking in fifth wheel camper/horse trailers when the trailers are parked or stationary, or otherwise occupied and in use. The stabilizer device 100 is adapted to be attached to a trailer's king pin box 102 and can be folded or retracted (as illustrated in FIG. 2) when not in use. The trailer stabilizing device 100 includes a first telescoping leg 104 having a top end 106 which is pivotally attached to a side surface 107 of the king pin box 102 and a bottom end 108 having a square or rectangular base 110. The top end 106 is pivotally attached using a pivoting member 112 enabling the first telescoping leg 104 to transition between a folded or retracted state (FIG. 2) and an unfolded or deployed state (FIG. 1). The first telescoping leg 104 is telescoping and includes a plurality of telescoping pins 114 on the narrow member 116. An adjustment knob 118 engages with one of the plurality of the telescoping pins 114 to adjust a length of the first telescoping leg 104. The base 110 is used for providing a stable position of the leg 104 on any terrain and surface for providing support to the trailer.

Figure 3:
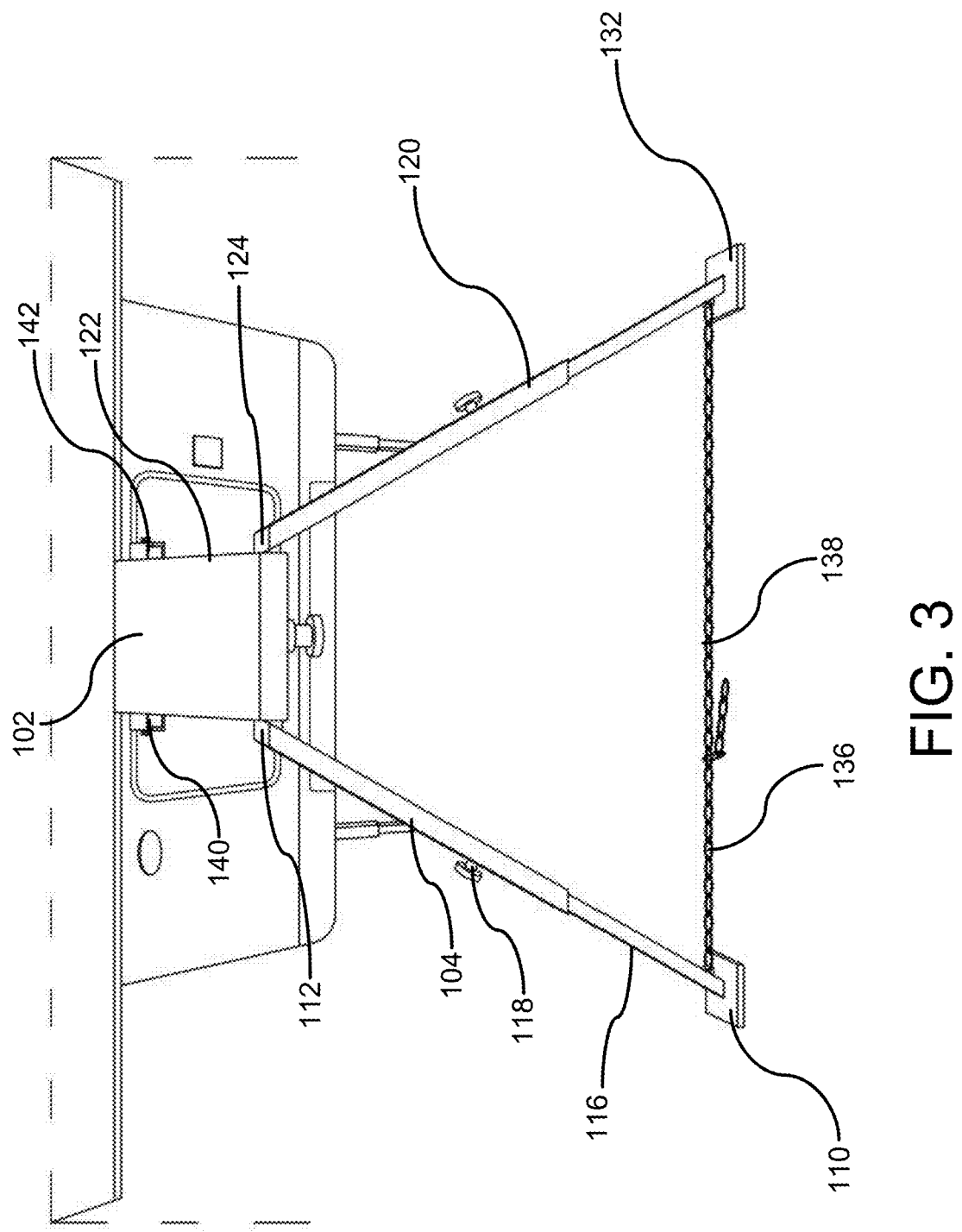
FIG. 3 illustrates a planar perspective view of the foldable fifth wheel trailer stabilizer device of FIG. 1 in accordance with the disclosed structure.

Referring to FIGS. 1 and 3, the foldable fifth wheel trailer stabilizer device 100 includes a second telescoping leg 120 which is symmetrical to the first telescoping leg 104. The second telescoping leg 120 is pivotally attached to the opposite side surface 122 of the s king pin box 102. The leg 120 is attached using a second pivoting member 124 enabling the leg 120 to transition between unfolded or deployed state (FIG. 3) and a folded or retracted state as illustrated in FIG. 2. The second telescoping leg 120 is telescoping and includes a plurality of telescoping pins 126 on the narrow member 128. An adjustment knob 130 engages with one of the plurality of the telescoping pins 126 to adjust a length of the second telescoping leg 120. The base 132 at the bottom end 134 of the leg 120 is used for providing an independent and stable platform for the leg 120 on any terrain and surface for providing support to the trailer.

The legs 104, 120 include a corresponding chain 136, 138 respectively for providing additional support to the trailer wherein the chains 136, 138 can be tied together preventing or controlling lateral movement of the bases 110, 132. For providing support to the legs 104, 120 in the folded state, adjustable supporting members 140, 142 are positioned on the king pin box 102. The legs 104, 120 can be made of steel, iron, or any other metal and may have black powder coating for an appearance like the king pin box 102. The coating can also enhance the durability of the device 100 by protecting the device 100 from rust and corrosion.

In use, the legs 104, 120 provide support to the trailer and a user is not required to install the stabilizer device 100 and remove after use. The size of the stabilizer 100 can be designed to fit most 5th wheel trailers. The telescopic legs and adjustable knobs help the stabilizer 100 for use with different trailer heights and different terrain.

FIG. 2 illustrates a perspective view showing the fifth wheel trailer stabilizer device of the present invention in a folded or retracted state in accordance with the disclosed structure. When the stabilizer device 100 is not used for stabilizing the trailer, such as during travelling on a road, the chains 136, 138 are unfastened and the legs 104, 120 are retracted to the minimum possible length using the respective knobs 118, 130. Each leg is then pivotally moved along the side surfaces 107, 122 of the king pin box 102. As shown in the side view, the leg 104 is passed through the adjustable supporting member 140 for providing support to the leg 104 in the folded state or undeployed state. For protecting the stabilizer device 100, the chain 136 is fastened by passing through the adjustable supporting members 140. A mechanical or digital lock or any other securing mechanism 144 can be used for securing the device 100. It will be apparent to a person skilled in the art that the same mechanism is used for folding and securing the other leg 120. In the undeployed or uninstalled position, the legs 104, 120 adhere to the king pin box 102 and align to be a part of the king pin box 102. Also, the stabilizer 100 is not required to be removed and stored inside the trailer, thus, saving space inside the trailer during travel.

For folding the legs 104, 120, the corresponding pivoting 112, 124 can be pressed, pushed, or pulled. Alternatively, the legs 104, 120 can be simply rotated to transition between the folded state and the unfolded state. Referring again to FIG. 3, the chains 136, 138 can be fastened thereby providing support to both the legs 104, 120 and the chains can be integrally fastened or can be removable from the corresponding legs.

Figure 4:
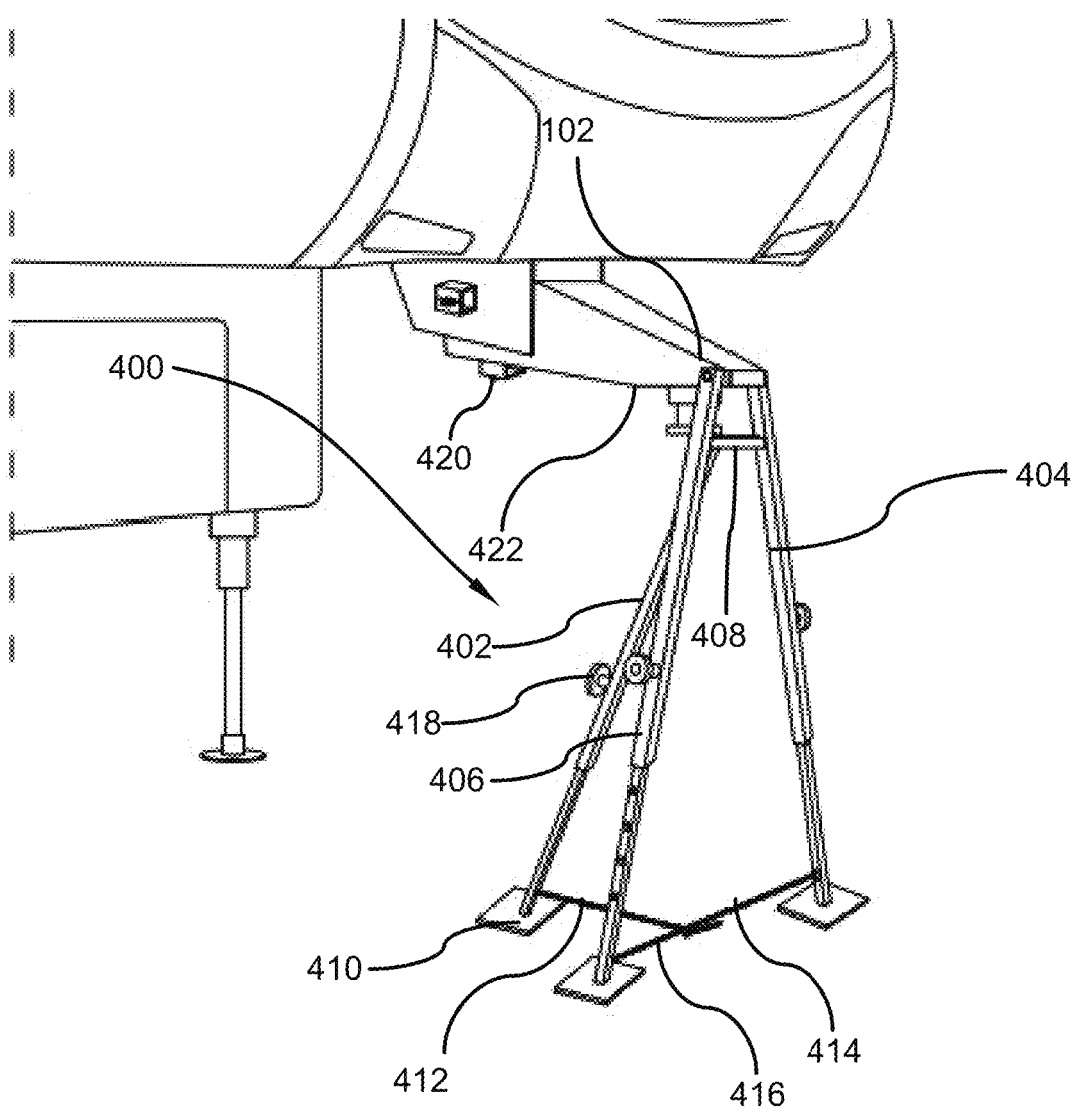
FIG. 4 illustrates another embodiment of the trailer stabilizing device of the present invention in accordance with the disclosed structure.

FIG. 4 illustrates another embodiment of the trailer stabilizing device of the present invention in accordance with the disclosed structure. In the present embodiment, the trailer stabilizing device 400 includes an additional leg 402 in addition to the two side legs 404, 406. A horizontal connecting member 408 connects the legs 404, 406 and the additional leg 402 extends from the member 408 to the base 410. The additional leg 402 includes a chain 412 which can be fastened to the chains 414, 416 of the other two legs 404, 406 for providing additional support to the stabilizing device 400. The additional leg 402 is telescoping and can be adjusted in length using the knob 418. The specifications of the legs 404, 406 are the same as described in other embodiments of the present invention.

Figure 5:
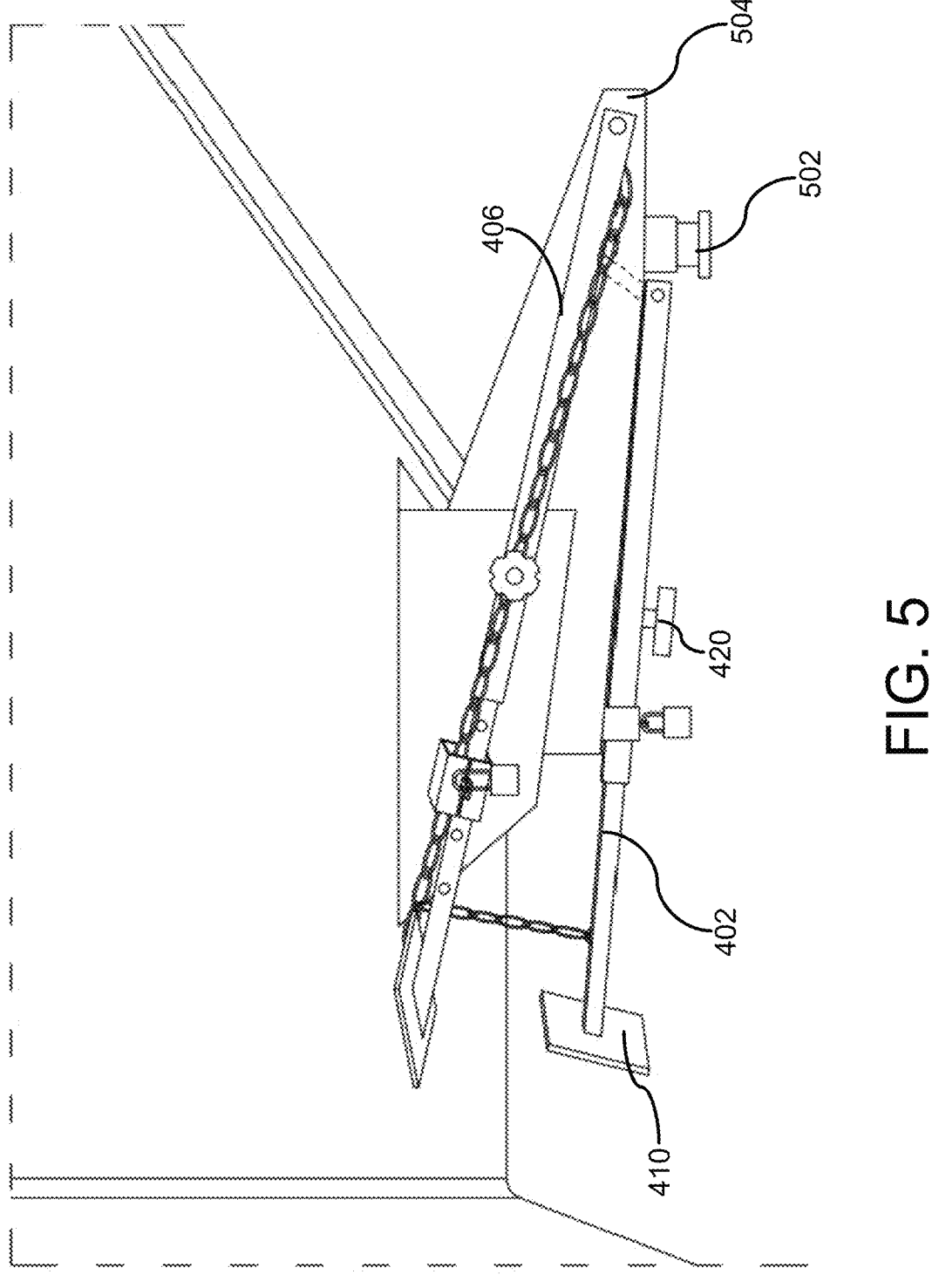
FIG. 5 illustrates the trailer stabilizing device of FIG. 4 in a folded state in accordance with the disclosed structure.

For supporting the additional leg 402 in the folded position as illustrated in FIG. 5, a supporting member 420 is disposed on the bottom surface 422 of the trailer king pin box 102. The additional leg 402 is pivotable relative to the horizontal connecting member 408 and in some embodiments, the additional leg 402 can be detached from the horizontal connecting member 408.

FIG. 5 illustrates the trailer stabilizing device of FIG. 4 in accordance with the disclosed structure. In the folded state, the telescopic legs 402, 404, 406 are retracted and are folded as described earlier in the disclosure. The additional leg 402 is foldable along the connection with the horizontal member 408 such that the additional leg 402 adheres to the bottom surface 422 of the box 102 and passes through the supporting member 420. It will be appreciated that the horizontal member 408 is strategically designed enabling the king's king pin 502 to be positioned between the distal end 504 of the box 102 and the horizontal member 408 when the additional leg 402 is folded. The telescoping legs 404, 406 when folded, fold the additional leg 402 automatically to fold and uninstall the stabilizing device 400.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "foldable fifth wheel trailer stabilizer device", "stabilizer device", "fifth wheel trailer stabilizer device", "trailer stabilizing device", and "device" are interchangeable and refer to the fifth wheel trailer stabilizing device 100, 400 of the present invention.

Notwithstanding the forgoing, the fifth wheel trailer stabilizing device 100, 400 of the present invention can be of any suitable size and configuration as is known in the art without affecting the overall concept of the invention, provided that it accomplishes the above stated objectives. One of ordinary skill in the art will appreciate that the fifth wheel trailer stabilizing device 100, 400 as shown in the FIGS. is for illustrative purposes only, and that many other sizes and shapes of the fifth wheel trailer stabilizing device 100, 400 are well within the scope of the present disclosure. Although the dimensions of the fifth wheel trailer stabilizing device 100, 400 are important design parameters for user convenience the fifth wheel trailer stabilizing device 100, 400 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fifth wheel trailer stabilizer device for attaching to a trailer, the fifth wheel trailer stabilizer device comprising:
   a trailer stabilizer device having a first telescoping leg, a second telescoping leg, and a third telescoping leg;
   wherein said first telescoping leg having a top end pivotally attached to a side surface of a king pin box and a bottom end including a first base;
   wherein said second telescoping leg having a top end pivotally attached to an opposing side surface of the king pin box and a bottom end including a second base;
   wherein said first telescoping leg and said second telescoping leg connected with a horizontal member proximal to the king pin box;
   wherein said third telescoping leg having a top end pivotally attached to said horizontal member proximal to the king pin box and a bottom end including a third base; and
   further wherein said first telescoping leg, said second telescoping leg, and said third telescoping leg pivot from an undeployed retracted state aligned with the king pin box to a deployed extended state orthogonal to the king pin box.

2. The fifth wheel trailer stabilizer device of claim 1, wherein said first telescoping leg having a first adjustment knob and a first plurality of telescoping pins, wherein said first adjustment knob engages a selected first telescoping pin for adjusting a length of said first telescoping leg.

3. The fifth wheel trailer stabilizer device of claim 2, wherein said second telescoping leg having a second adjustment knob and a second plurality of telescoping pins, wherein said second adjustment knob engages a selected second telescoping pin for adjusting a length of said second telescoping leg.

4. The fifth wheel trailer stabilizer device of claim 3, wherein said third telescoping leg having a third adjustment knob, wherein said third adjustment knob engages a selected position of said third telescoping leg for adjusting a length of said third telescoping leg.

5. The fifth wheel trailer stabilizer device of claim 4, wherein said trailer stabilizer device further comprising a first chain connecting said first telescoping leg and said second telescoping leg.

6. The fifth wheel trailer stabilizer device of claim 5, wherein said trailer stabilizer device further comprising a second chain connecting said third telescoping leg and said first chain.

7. The fifth wheel trailer stabilizer device of claim 6, wherein said chain connected to said first telescoping leg proximal to said first base and connected to said second telescoping leg proximal to said second base.

8. The fifth wheel trailer stabilizer device of claim 7, wherein said length of said first telescoping leg in said deployed extended state independent from said length of said second telescoping leg in said deployed extended state.

9. The fifth wheel trailer stabilizer device of claim 8, wherein said length of said second telescoping leg in said deployed extended state independent from said length of said third telescoping leg in said deployed extended state.

\* \* \* \* \*